S. W. NICHOLSON.
VEHICLE WINDOW CONTROL MECHANISM.
APPLICATION FILED JULY 17, 1920.

1,414,523.

Patented May 2, 1922.
2 SHEETS—SHEET 1.

Inventor
Stanley W. Nicholson
By Whittemore Hulbert and Whittemore
Attorneys

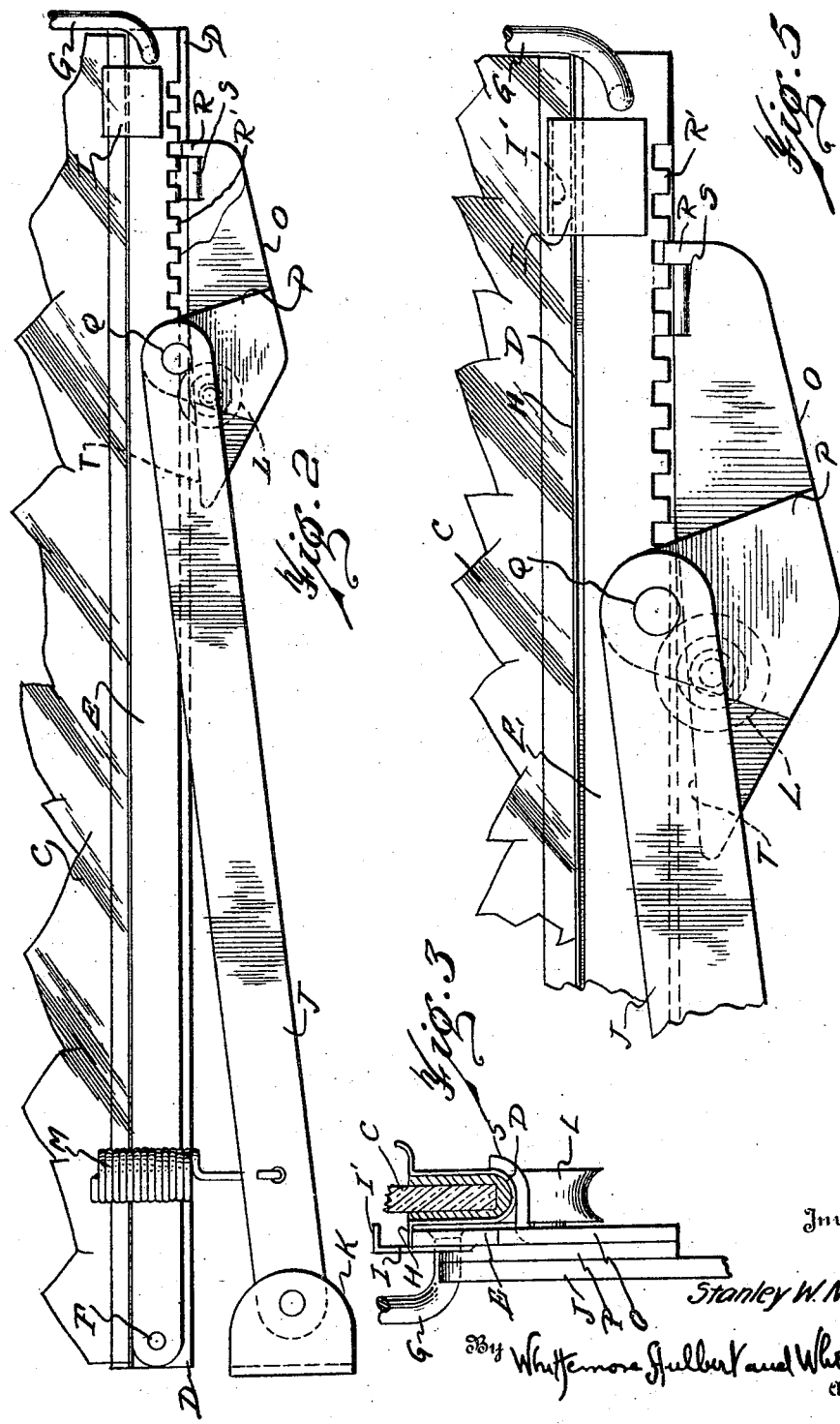

UNITED STATES PATENT OFFICE.

STANLEY W. NICHOLSON, OF TOLEDO, OHIO, ASSIGNOR TO DURA MECHANICAL HARDWARE COMPANY, OF TOLEDO, OHIO, A CORPORATION OF DELAWARE.

VEHICLE WINDOW-CONTROL MECHANISM.

1,414,523.

Specification of Letters Patent. Patented May 2, 1922.

Application filed July 17, 1920. Serial No. 397,009.

*To all whom it may concern:*

Be it known that I, STANLEY W. NICHOLSON, a citizen of the United States of America, residing at Toledo, in the county of Lucas and State of Ohio, have invented certain new and useful Improvements in Vehicle Window-Control Mechanism, of which the following is a specification, reference being had therein to the accompanying drawings.

This invention relates to window control mechanisms and more particularly to control mechanisms for automobile and other vehicles.

It is the object of the invention to provide a simple and efficient manually operable mechanism for raising or lowering the glass in a window of the sliding glass type, and for retaining the glass in different positions of adjustment.

A further object is to provide a simple and inexpensive, yet efficient, spring means for counter-balancing the weight of the sliding glass.

The invention consists in certain arrangements and combinations of parts as will more fully hereinafter appear.

In the accompanying drawings:

Figure 2 is an enlarged view of the control mechanism shown in Figure 1, the locking means being disclosed in the unlocked position, resulting from upward actuation of the control mechanism;

Figure 3 is an end view of the same;

Figure 5 is a similar fragmentary view, but showing the locked position assumed by the locking mechanism when no actuating stress is exerted.

Figure 1:
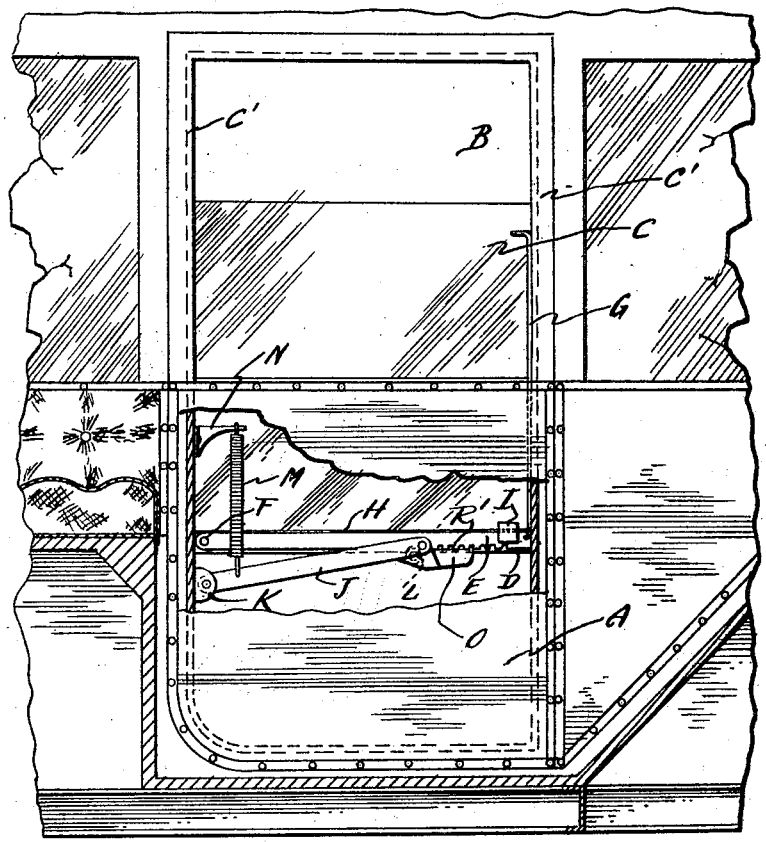
Figure 1 is an interior view of a motor vehicle door to which the invention is applied.

In these views the reference character A designates an automobile door, the lower portion of which is of the usual hollow or chambered construction, while the upper portion is provided with a window opening B and with a vertically slidable plate of glass C providing a closure for said opening when raised and entering the chambered lower portion of the door when downwardly adjusted. The lower edge of said plate is embraced by a sheet metal channel member D, which is secured to the glass in any desired manner. A locking bar E is pivoted as indicated at F upon one end of the channel member D, and extends preferably the full length of said channel member, the free end of said bar being pivotally engaged by the lower extremity of a control stem G which extends upwardly adjacent one of the side posts C' of the door within the window opening B. A flange H on the channel member D forms a stop limiting upward swinging of the bar E beyond a horizontal position, said flange insuring upward movement of the channel member and glass when the bar E is upwardly actuated by the rod G. A bracket I secured to the bar E adjacent its free end is flanged as indicated at I', to form a stop which limits downward swinging of said bar and insures a downward actuation of the channel member D and glass C when a down thrust is exerted upon the stem G. To counterbalance the weight of the glass, there is mounted beneath the same a bar J, one end of which is pivoted upon a bracket K secured to one of the said side posts C' of the door, while the other or free end of said bar carries a grooved roller L engaging beneath the channel member D, said bar being upwardly urged with a force substantially equal to the weight of the window by a coiled spring M, secured at its lower end to the bar adjacent its pivotal support, and its upper end to a bracket N upon the post C'. With this counterbalancing means, there is combined a locking means as follows:

A detent O, preferably formed of sheet metal is pivotally carried by the free end of the bar J and engages beneath the locking bar E. Preferably said detent has a separately formed pivot-forming member P which is welded or brazed, or otherwise secured to a lateral face of said detent and projects above the detent to engage a pivot pin Q carried by the bar J. Said detent has a portion projecting beyond the free end of the bar J, which portion terminates in a tooth R projecting upwardly and adapted to engage a rack of teeth R', formed upon the lower edge of the bar E. Adjacent the tooth R, said detent is formed with a struck out laterally projecting tongue S, which is curved to engage beneath the channel member D, so as to limit upward swinging of the toothed end of the detent. Said detent also projects some distance in the opposite direction beyond its pivot Q, and the upper edge of this last mentioned projecting portion is inclined slightly to the remaining portion of the upper edge, as indicated at T. The roller L is mounted upon the detent O at the opposite side of its pivot Q from the tooth R.

Figure 4:
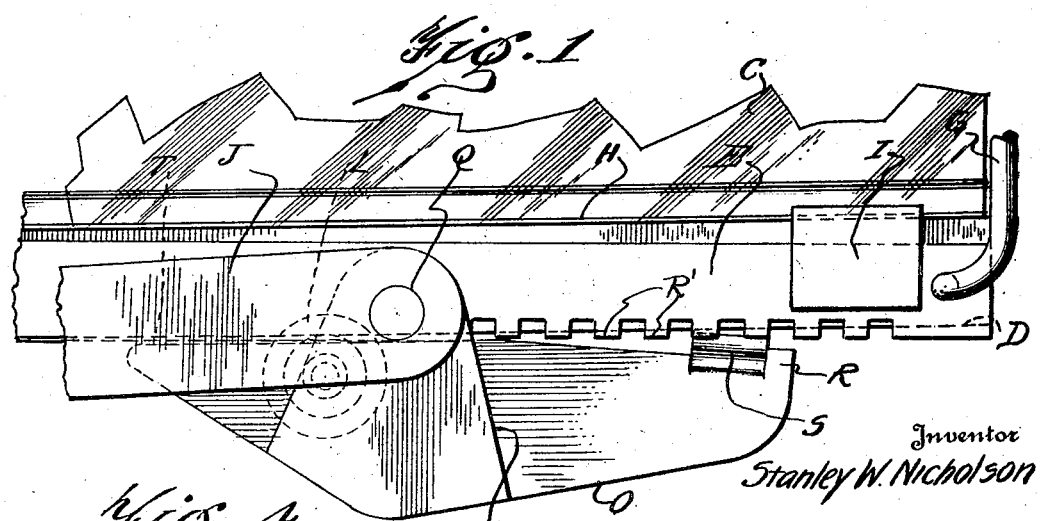
Figure 4 is a fragmentary view similar to a portion of Figure 2, but showing the unlocked position of the locking mechanism resulting from a downward actuation of the control means.

Discussing now the operation of the described invention, when an upward pull is exerted upon the rod G, the bar E is drawn up against the flange H of the channel member D, as is illustrated in Figures 2 and 3, the rack teeth R' thus being disengaged from the tooth R of the detent. Thus, the channel member D and glass C are free to move upward responsive to the pull on the stem G, while the detent shifts transversely of said channel member, the roller L traveling along said member. When a down thrust is exerted upon the stem G, the bar E is shifted to the position disclosed in Figure 4, this position being established by engagement of the flange I' with the flange H. During this movement of the bar E, the detent O is rocked to the position disclosed in Figure 4, owing to engagement of the upper edge portion T of said detent by the lower edge of the bar E, the tooth R being shifted clear of the rack R', so that the channel member D and glass C are free to move downwardly, responsive to the rod G, no resistance being offered to the necessary travel of the detent longitudinally of the member D. When after shifting the glass to any desired position of adjustment, the stem G is released, the bar E drops slightly below the horizontal position and engages the rack R' with the tooth R of the detent O, said detent is maintained in a position adapting it for such engagement by the upward stress acting at the pivot point Q and causing the roller L and the stop member S at opposite sides of said pivot point, to bear upwardly against the channel member D.

The described construction is one comprising relatively few parts, effecting a very perfect counter-balancing of the window, providing a simple actuating means for the latter and providing for locking of the window in practically any desired position of adjustment.

What I claim as my invention is:

1. In a window control mechanism, the combination with a sliding window, of a rack bar carried by said window extending transversely of the direction in which the window is slidable, a detent for engaging said rack bar, means for shifting said detent longitudinally of the bar upon sliding movement of the window, and means automaticaly releasing the detent from the rack bar upon actuation of the window.

2. In a window control mechanism, the combination with a sliding window, of a rack bar mounted upon said window and extending transversely of the direction in which the window is slidable, a detent normally engaging said rack bar, means compelling travel of said detent longitudinally of said bar upon travel of the window actuating member for the window, and means for disengaging said detent and rack bar upon actuation of said member.

3. In a window control mechanism, the combination with a sliding window member, of a rack bar pivotally mounted upon said window transversely of its direction of travel, a detent normally engaging said rack bar, means compelling travel of said detent longitudinally of the rack bar upon actuation of the window, and an actuating member for the window engaging said rack bar whereby upon actuation of said member, the rack bar is initially shifted to disengage the same from said detent to permit subsequent actuation of the window.

4. In a window control mechanism, the combination with a vertically slidable window, of a rack bar transversely carried by said window, a counter-balancing arm for the window arranged beneath the same, a detent mounted upon said counter-balancing arm and normally engaging said rack bar to lock the window against vertical movement, and an actuating member for the window adapted to disengage the rack bar and detent upon initial actuation.

5. In a window control mechanism, the combination with a vertically slidable window, of a rack bar transversely mounted upon said window, a pivotal counter-balancing arm for the window, a detent pivoted upon said counter-balancing arm normally engaging said rack bar to lock the window against vertical movement, and a common means for actuating the window and for releasing said detent from said rack prior to actuation of the window.

6. In a window control mechanism, the combination with a vertically slidable window member, of a rack bar transversely pivoted upon said member, a pivotal counter-balancing arm for the window member, a detent carried by said arm normally engaging said rack bar to lock the window member against movement, and an actuating member for said window member connected to said rack bar and forming a means for rocking said rack bar on its pivot to effect disengagement of said bar from said detent prior to actuation of the window.

7. In a window control mechanism, the combination with a vertically slidable window member, of a counter-balancing arm for said member engaged at one end beneath said member and pivotally mounted at its other end and means normally locking said counter-balancing arm against transverse movement relative to the window member, and common control means for the window member and for said locking means.

8. In a window control mechanism the combination with a vertically slidable window member, of a yieldable support for said member engaging beneath the latter, means normally locking said support against yielding and a control member for said locking means extending to the upper portion of the window member.

9. In a window control mechanism the combination with a vertically slidable window member, of counterbalancing means therefor, a locking means at the point of engagement of said counterbalacing means with the window member, and a control member for said locking means forming also an actuating member for the window member and extending to the upper portion of the latter.

10. In a window control mechanism, the combination with a vertically slidable window member, of a rack bar angularly adjustable upon said member, a latch element engageable with said rack bar to hold the window member in adjustment, and means carried by the window member for angularly shifting the rack bar into or out of engagement with said latch member.

11. In a window control mechanism, the combination with a vertically slidable window member, of a rack bar angularly adjustable upon said member, a latch element engageable with said rack bar to hold the window member in adjustment, and a common means for swinging said rack bar clear of said latch member and for actuating sliding movement of the window member.

12. In a window control mechanism, the combination with a vertically slidable window member, of a rack bar transversely adjustable upon said window member, a latch element engageable with said rack bar to hold the window member in adjustment, and means carried by the window member for transversely shifting said rack bar to engage or disengage the same from said latch member.

13. In a window control mechanism, the combination with a sliding window, of a rack bar carried by said window extending transversely of the direction in which said window slides, a detent engageable with said rack bar to hold the window member adjusted, and means automatically releasing said detent from the rack bar upon actuation of the window.

14. In a window control mechanism, the combination with a vertically sliding window member, of locking means for said member engaging the latter therebeneath, and a member carried by the window member for controlling said locking means and actuating sliding of said window member.

15. In a window control mechanism, the combination with a sliding window member, of a pivotal arm engaging said window member, means yieldably urging said arm toward the window member, a locking element carried by the window member coacting with said arm to lock the latter against angular movement and thereby lock said window member in adjustment, and a control element for said latch member upwardly extending upon the window member.

16. In a window control mechanism, the combination with a vertically sliding window member, of a chamber receiving said member in its lowered position, locking means for said member engaging the latter therebeneath and disposed within said chamber, and a member carried by the window member for controlling said locking means and actuating sliding of the window member.

17. In a window control mechanism, the combination with a vertically sliding window member, of a latch element adjustable along the lower edge of said window member, means carrying said latch element independently of the window member and control means for said latch element carried by the window member.

18. In a window control mechanism, the combination with a vertically sliding window member and a chamber receiving said member in its lowered position, means within said chamber having latch engagement with said window member intermediate the side edges thereof, and a control member for said means carried by the window member.

In testimony whereof I affix my signature.

STANLEY W. NICHOLSON.